No. 746,117. PATENTED DEC. 8, 1903.
P. LITTLE, Sr.
ANTIFRICTION WHEEL.
APPLICATION FILED JAN. 13, 1902.
NO MODEL.

WITNESSES
E. J. Hursol
Mae Davis

INVENTOR
Peter Little Sr.
By L. M. Thurlow,
ATTY.

No. 746,117.

Patented December 8, 1903.

UNITED STATES PATENT OFFICE.

PETER LITTLE, SR., OF PEORIA, ILLINOIS.

ANTIFRICTION-WHEEL.

SPECIFICATION forming part of Letters Patent No. 746,117, dated December 8, 1903.

Application filed January 13, 1902. Serial No. 89,612. (No model.)

*To all whom it may concern:*

Be it known that I, PETER LITTLE, Sr., a citizen of the United States, residing at Peoria, in the county of Peoria and State of Illinois, have invented certain new and useful Improvements in Antifriction-Wheels; and I do hereby declare that the following is a full, clear, and exact description of the invention, which will enable others skilled in the art to which it appertains to make and use the same.

This invention pertains to improvements in antifriction-bearings for mining-cars and other varieties of rolling-stock, but pertains more particularly to antifriction-bearings for car-wheels.

The primary object of the invention is to reduce the friction in car-wheel bearings to a minimum.

A further object of the invention is to distribute the weight of the load carried by the wheel, so that no excessive amount of wear will be thrown upon any one bearing-point.

A still further object is to provide a construction wherein the wear is evenly distributed over the different points of bearing, thus making a longer-lived, and consequently more efficient, bearing.

A further object is to construct a bearing for car-wheels which will have very little friction when an end thrust or a thrust in the direction of the length of the axle is imposed upon it—as, for instance, in passing around a curve.

A still further object of the present invention is to do away with the work incident to pressing wheels upon their axles, as in the old methods of affixing such wheels to their axles.

A further and more important object of my invention is to provide a wheel which when broken or rendered unfit for further use may be easily and quickly removed and a new one substituted without the necessity of removing an entire truck from beneath the car to replace the wheel, and, further, to preclude the necessity of placing an entirely new axle and wheels, as is the ordinary course of procedure.

In addition to these various important objects I provide a bearing of peculiar form whose parts may be either affixed to the axle or be permitted to travel or rotate thereon, all of which will appear in the following specification aided by the accompanying drawings, in which—

Figure 1:
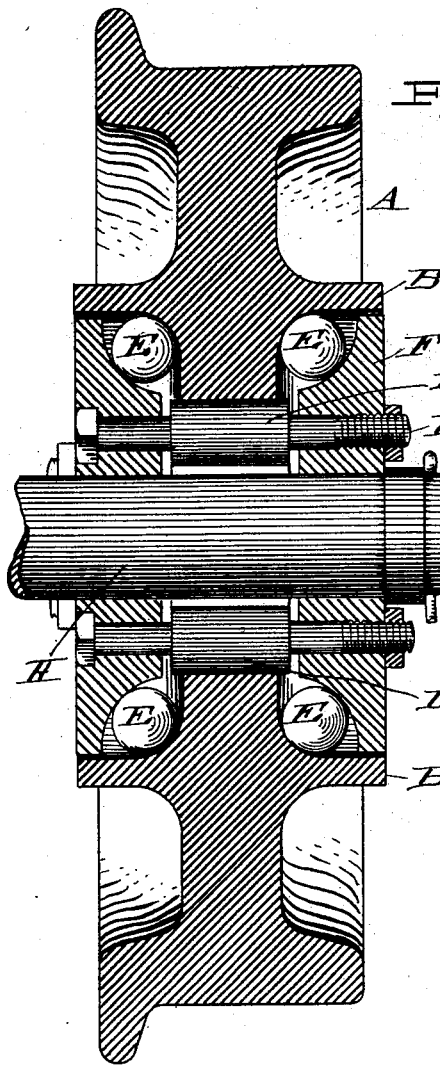
Figure 2:
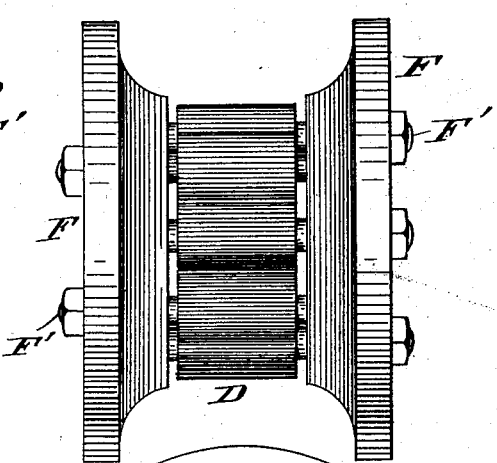
Figure 3:
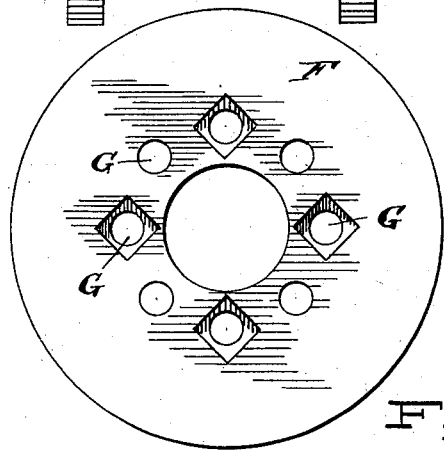

Figure 1 is a transverse section of the wheel and bearings. Fig. 2 is an edge view of two bearing-cones, showing a series of friction-rollers between them. Fig. 3 is a face view of the outside of one of the cones, showing an aperture for the reception of the axle and also showing holes for receiving spindle-bolts for carrying the rollers shown in Fig. 2.

In the figures, A represents the wheel, having a hub composed of a projecting annular lip B at each side. The lips terminate at the middle of the wheel in a bearing-surface C, which forms a surface for the travel of a set of friction-rollers D, as shown. At the juncture of the lips and the surface C the metal is rounded out to form a ball-race for the reception of a series of steel balls E, which are kept in place by means of cones F at each side of the wheel. In casting the wheel I make the ball-race sufficiently hard by the chilling process to resist the cutting tendency of the balls, and I also harden the surface C in the same manner to provide a surface for the rollers D. After the wheel is taken from the mold the said ball-race and surface C are ground perfectly smooth by any of the known methods to form proper surfaces for the balls and rollers. The cones F are of hardened steel and are provided with a series of holes G, running parallel with the axes thereof, which receive what I have hereinbefore termed and shall hereinafter term "spindle-bolts" F'. The latter are made to snugly fit the holes provided therefor and alternate in the position of their heads, as shown in the figures, and especially in Fig. 3, the purpose of which appear later. Upon each spindle-bolt is placed a hardened roller D, above described, made perfectly true and smooth as to its bore and external friction-surface. The rollers are placed a sufficient distance apart to allow them to revolve without fear of contact with one another. This of course is determined by the position and spacing of the spindle-bolts. In addition to this precaution I also keep the axle H and the rollers well separated for the same purpose.

The act of assembling the parts is quite simple and easy and may be done in the manner best suited to the desires of the person having that work in charge. As before mentioned, the bolts F' are arranged with the head of one alternating with the threaded end of another. The heads are let into square sockets G' in each cone flush with the surfaces thereof, so that in turning the nuts the bolts cannot move. There are several advantages in this construction, among which may be mentioned the fact that while the bolts are held against turning the cones are interchangeable, and, furthermore, each nut may be readily reached with a wrench even when the spindle-bolts are placed as close together as it is possible to get them. Adjustment is also had at each side of the wheel by this means, and this will be found to be an advantage. As shown in Fig. 1, a sleeve I is placed over the end of the axle against the cone, and a linchpin is passed through the axle to prevent the wheel slipping off. At the other side of the wheel the same means may be employed, if desired, though other equally simple methods may be employed.

As stated in the objects of the invention, I provide the cones F, which may rotate on the shaft or may be secured thereto. In practice the apertures in the cones are of such size as to snugly fit the axle without having the least rocking movement thereon and at the same time allow them to rotate, if desired. The spindle-bolts cannot be tightened unevenly, therefore, so as to clamp the balls at any one point, but rather would have the effect of clamping them all. By permitting the cones to slowly work around the shaft the balls are prevented from traveling over a fixed path, but instead will traverse the entire periphery of said cones. However, I may provide means for locking the cones against movement, but so arranged that when desired they may be turned slightly on the shaft to present a new surface for the travel of the balls.

In use the axle remains stationary, being affixed in any good manner to the car, and the weight of the car is transferred through the axle to the cones and thence to the balls at the bottom of the ball-race, said weight being also transferred to the rollers D at the bottom of the surface C. The natural tendency of the balls when the weight is imposed upon them is to force the cones apart, and this tendency keeps a pressure against the nuts of the spindle-bolts and prevents movement thereof, although lock-nuts may be used, if desired. The arrangement of the entire device is such that the weight is distributed equally upon the various bearing-points. When rounding a curve, the weight of the load is thrust against the series of balls nearest the weight; but this weight is also sustained by the rollers, so that the balls and the rollers assist each other. It is not my purpose to confine myself to any particular construction as to any of the parts, as I may wish to use other means than those shown or provide a different arrangement thereof—for instance, the number of spindle-bolts employed is immaterial to the proper operation of the bearing. I have shown eight of these only as a matter of convenience in the drawings. Any other changes as to size of parts or arrangement thereof may be made without departing from the spirit of my invention.

An advantage in providing independent wheels, as in the present instance, is that in passing around curves each wheel is free to travel at its own speed. The fact is well known that the outer wheels of a car have a tendency to travel faster than the inner ones when on a curve. This must result in placing a retarding action on the wheels, for the reason that the outer one though inclined to travel faster is prevented from so doing by reason of its rigid connection by the shaft with the opposite wheel, which is moving slower on the inside rail. A very great useless friction on the rails results from this and more power is required to draw the load.

I claim—

1. In an antifriction-bearing for car-wheels a non-revolving axle for the car for carrying the wheel, such wheel having a bore greater in diameter than the diameter of the said axle, there being a recess at each side of the portion having the bore to form a ball-race, ball-cones on the axle, the same being free to turn thereon, balls between the wheels and cones in said recesses, a series of bolts extending through the cones for preventing separation thereof and also for holding them as against revolving independent of one another and rollers carried on said bolts to turn thereon wholly free of the axle but assisting in carrying the axle through the medium of the lower periphery of the cones, the balls below the axle and the rollers also below the said axle.

2. In an antifriction-bearing, a non-revolving axle for carrying the wheel, such wheel having a bore greater in diameter than the diameter of the axle, and having a recess at each side forming a ball-race, ball-cones on the axle, a series of balls in each recess and held therein by the cones, a series of rollers surrounding the shaft but entirely free thereof, said rollers being carried by and between the cones within the bore of the wheel and adapted to bear upon the inner surface of the said bore beneath the axle, said axle being supported through the cones, the balls and the rollers beneath said axle as described.

3. In an antifriction-bearing, a non-revolving axle for carrying the wheel, such wheel having a bore greater in diameter than the diameter of the axle, cones fitting on the axle at each side of the wheel, the balls between the cones and the wheel, there being a recess at each side of the wheel for receiving the balls, and a series of rollers adapted to bear upon the inner surface of the bore of the wheel and surrounding the axle but entirely removed therefrom and means for carrying the rollers between the cones substantially as and for the purposes set forth.

4. In an antifriction-bearing for car-wheels, the latter having ball-races, balls located in said ball-races, cones for the balls, an axle passing through the cones and supported thereby, a series of rollers supported between the cones by spindles passing therethrough and through said cones, there being a bearing-surface within the hub of the wheel forming the traveling surface for the rollers substantially as set forth.

5. In an antifriction-bearing for car-wheels, the latter having ball-races therein, of ball-cones for said wheel, balls held between the said cones and the ball-races, a series of friction-rollers supported by and between the cones, there being a bearing-surface within the wheel between the cones for receiving the rollers, and the axle passing through the cones the latter being free to turn on the axles as described substantially as and for the purposes set forth.

In testimony whereof I affix my signature in presence of two witnesses.

PETER LITTLE, SR.

Witnesses:
F. D. LYMAN,
JOSEPH STOREY.